United States Patent
Jons et al.

(10) Patent No.: US 8,348,499 B2
(45) Date of Patent: Jan. 8, 2013

(54) METHOD OF TESTING SPIRAL WOUND MODULES BY THERMAL IMAGING

(75) Inventors: Steven D. Jons, Eden Prairie, MN (US);
William A. Jons, Eden Prairie, MN (US)

(73) Assignee: Dow Global Technologies LLC, Midland, MI (US)

( * ) Notice: Subject to any disclaimer, the term of this patent is extended or adjusted under 35 U.S.C. 154(b) by 351 days.

(21) Appl. No.: 12/903,254

(22) Filed: Oct. 13, 2010

(65) Prior Publication Data
US 2011/0170572 A1    Jul. 14, 2011

Related U.S. Application Data

(60) Provisional application No. 61/294,207, filed on Jan. 12, 2010.

(51) Int. Cl.
*G01N 25/00* (2006.01)
*G01N 25/40* (2006.01)

(52) U.S. Cl. ............ 374/4; 374/120; 374/141; 374/112; 374/137; 428/36.9

(58) Field of Classification Search .............. 374/4, 141, 374/120, 121, 135, 57, 147, 167, 166, 137, 374/29, 30, 112; 250/338.1; 428/36.9
See application file for complete search history.

(56) References Cited

U.S. PATENT DOCUMENTS

| | | |
|---|---|---|
| 4,277,344 A | 7/1981 | Cadotte et al. |
| 4,765,897 A | 8/1988 | Cadotte et al. |
| 4,888,116 A | 12/1989 | Cadotte et al. |
| 4,964,998 A | 10/1990 | Cadotte et al. |
| 5,096,584 A | 3/1992 | Reddy et al. |
| 5,538,642 A | 7/1996 | Solie et al. |
| 5,640,236 A | 6/1997 | Nagashima |
| 5,658,460 A | 8/1997 | Cadotte et al. |
| 5,755,964 A | 5/1998 | Mickols et al. |
| 5,763,765 A | 6/1998 | Lamont et al. |
| 6,066,254 A | 5/2000 | Huschke et al. |
| 6,280,853 B1 | 8/2001 | Mickols et al. |
| 6,299,772 B1 | 10/2001 | Huschke et al. |

(Continued)

FOREIGN PATENT DOCUMENTS
EP    448973 A1 * 10/1991
(Continued)

OTHER PUBLICATIONS

U.S. Appl. No. 61/252,746, Steven D. Jons, Method of Testing the Integrity of Spiral Wound Modules, filed Oct. 19, 2009.

(Continued)

*Primary Examiner* — Gail Verbitsky
(74) *Attorney, Agent, or Firm* — Edward W. Black

(57) ABSTRACT

Various methods for testing spiral wound modules by thermal imaging are described. In a preferred embodiment, the method(s) includes flowing a gas between a scroll face and permeate collection tube of a spiral wound module and detecting temperature differences on the scroll face. Temperature differentials on the scroll face may be captured as a thermal image. The location(s) of temperature differentials on the scroll face can be correlated to defects in the module. In preferred embodiments, the subject test methods are non-destructive and can be applied to spiral wound modules in either a dry or wet condition.

10 Claims, 3 Drawing Sheets

U.S. PATENT DOCUMENTS

| | | |
|---|---|---|
| 6,632,356 B2 | 10/2003 | Hallan et al. |
| 6,680,778 B2 | 1/2004 | Hinnrichs et al. |
| 6,763,765 B2 | 7/2004 | Crowson |
| 6,766,259 B2 | 7/2004 | Padgett et al. |
| 6,878,278 B2 | 4/2005 | Mickols et al. |
| 7,771,494 B2 * | 8/2010 | Rangachari et al. ........ 23/295 R |
| 8,101,074 B2 * | 1/2012 | Larsen .......................... 210/232 |
| 8,210,042 B2 * | 7/2012 | Mickols et al. ................. 73/587 |
| 2002/0176617 A1 | 11/2002 | Simonetti |
| 2004/0019438 A1 | 1/2004 | Padgett et al. |
| 2005/0050943 A1 | 3/2005 | Barber et al. |
| 2006/0219921 A1 * | 10/2006 | Baca et al. ................. 250/338.1 |
| 2007/0027628 A1 | 2/2007 | Geelen |
| 2007/0089489 A1 | 4/2007 | Lewnard et al. |
| 2007/0251883 A1 | 11/2007 | Niu |
| 2008/0105038 A1 | 5/2008 | Jons et al. |
| 2008/0185332 A1 | 8/2008 | Niu et al. |
| 2008/0202242 A1 | 8/2008 | Mickols et al. |
| 2009/0159527 A1 | 6/2009 | Mickols et al. |
| 2009/0194479 A1 | 8/2009 | Niu et al. |
| 2009/0220690 A1 | 9/2009 | Niu et al. |
| 2010/0135354 A1 * | 6/2010 | Watanabe et al. ............. 374/123 |
| 2011/0174156 A1 * | 7/2011 | Saunders et al. .................. 95/46 |

FOREIGN PATENT DOCUMENTS

| | | |
|---|---|---|
| EP | 1296125 | 3/2003 |
| EP | 1300186 | 2/2007 |
| EP | 1775015 | 4/2007 |
| FR | 2371184 | 3/1992 |
| GB | 1488096 | 10/1977 |
| GB | 2232676 | 12/1990 |
| JP | 56124403 | 9/1981 |
| JP | 2007-007539 | 1/2007 |
| JP | 2010082587 | 4/2010 |
| WO | 9820059 | 5/1998 |
| WO | 02095370 | 11/2002 |
| WO | 2007067751 | 6/2007 |

OTHER PUBLICATIONS

U.S. Appl. No. 12/436,819, Steven D. Jons, Method of Testing Membranes and Membrane-Based Systems, filed May 7, 2009.

* cited by examiner

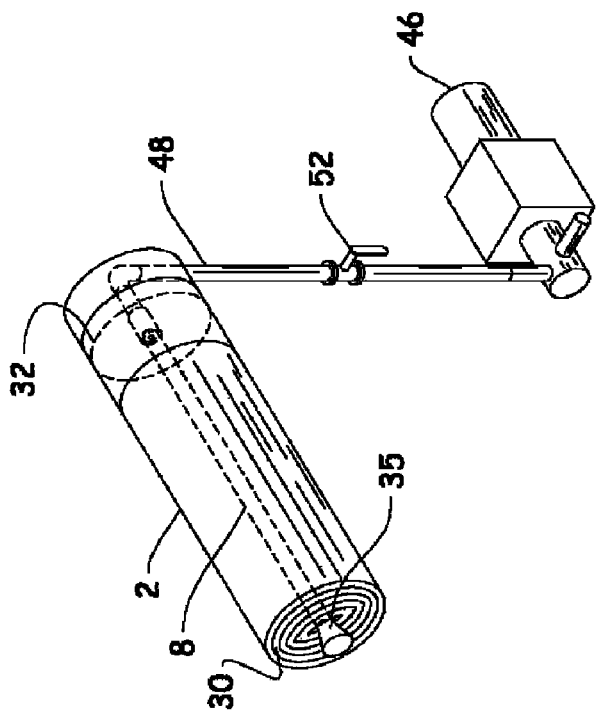
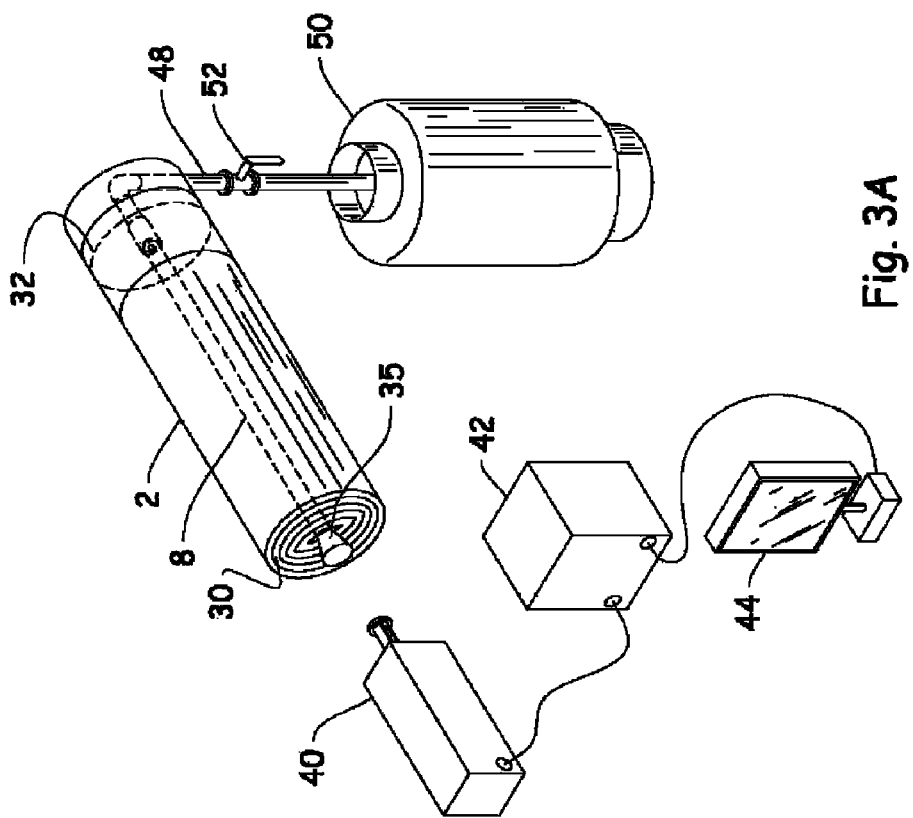
Fig. 3A
Fig. 3B

METHOD OF TESTING SPIRAL WOUND MODULES BY THERMAL IMAGING

CROSS REFERENCE STATEMENT

This application claims the benefit of U.S. Provisional Application No. 61/294,207, filed Jan. 12, 2010, the entire content of which is incorporated herein by reference.

TECHNICAL FIELD

The present invention is directed toward means and methods for testing the integrity of spiral wound modules by use of thermal imaging. In a preferred embodiment, the method(s) includes flowing a gas between a scroll face and permeate collection tube of a spiral wound module and detecting temperature differences on the scroll face. Temperature differentials on the scroll face may be captured as a thermal image.

DESCRIPTION OF THE RELATED ART

A variety of membrane-based modules are known in the art including spiral wound, tubular, hollow fiber and plate-and-frame type configurations. Each type of module may have leaks due to defects in various component parts or as a result of defects in manufacturing process utilized to construct the module. For example, leaks in spiral wound modules typically occur due to defects in the membrane sheets (e.g. pinholes, scratches or other defects), or misaligned membrane sheets and failed glue lines which may occur during module assemble. Due to their wound configuration, such defects are particularly difficult to detect and locate in spiral wound modules.

US 2008/0105038 describes a method for testing spiral wound modules involving the introduction of test particles into a liquid feed stream from the module. The particles are of a size larger than the nominal cut-off of the membrane such that the detection of particles within the permeate can be correlated to a leak. While effective, such techniques require that the module be tested during operation, i.e. "on-line" with feed liquid flowing thru the module.

JP 2007/007539 describes another type of on-line test method involving the introduction of pressurized gas into the feed liquid and subsequent detection of bubbles in the permeate liquid.

ASTM D 6908-03 (Integrity Testing of Water Filtration Membrane Systems) describes a variety of methods for testing the integrity of membrane systems including pressure and vacuum decay tests.

STATEMENT OF THE INVENTION

The present invention is directed toward means and methods for testing spiral wound modules. In one embodiment the method comprises the steps of: flowing a gas between the scroll face and permeate collection tube wherein the gas has a different temperature than that of the scroll face; and detecting temperature differences on the scroll face of the spiral wound module. Many additional embodiments are disclosed.

BRIEF DESCRIPTION OF THE DRAWINGS:

FIG. 3A is a schematic view of an idealized set-up for practicing one embodiment of the invention.

FIG. 3B is a schematic view of an alternative idealized set-up for practicing another embodiment of the invention.

Figure 1:
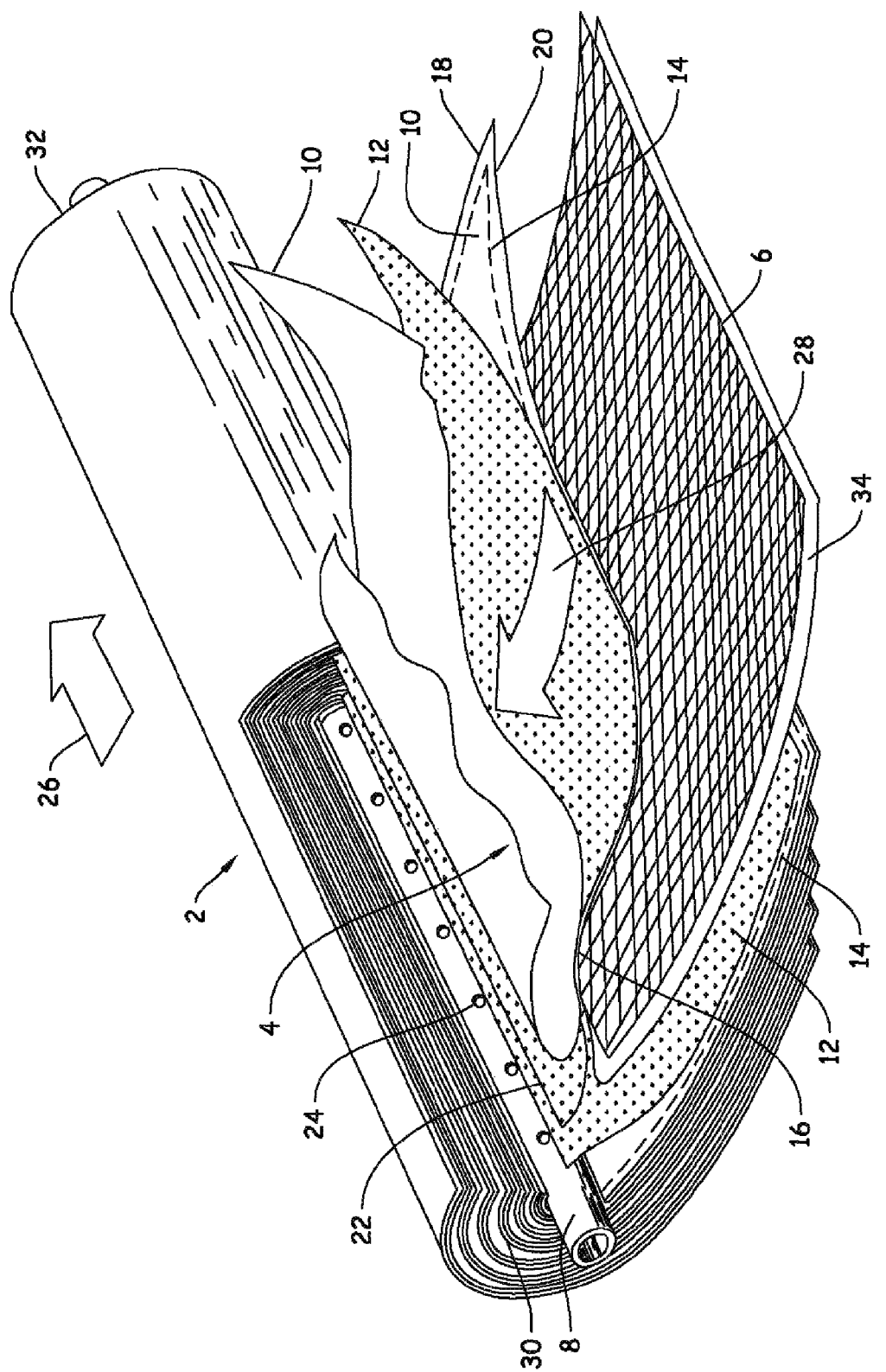
FIG. 1 is a perspective, partially cut-away view of a spiral wound module.

DETAILED DESCRIPTION OF THE INVENTION:

Spiral wound modules (also referred to as "elements") are well known for use in a variety of fluid separations including both gas and liquid phase separations. Due to their spiral configuration, a relatively large membrane surface area can be packed into an individual module. Depending upon the specific membrane used, spiral wound modules can be used in a wide variety of applications including: reverse osmosis (RO), nanofiltration (NF), ultrafiltration (UF) and microfiltration (MF); however, for purposes of the present invention RO and NF are preferred. Examples of common liquid separations include the treatment of liquid feeds such as the concentration and/or salt removal in food, dairy and sweetener feeds; desalination of water, removal of divalent ionic species such as calcium and barium ions, and removal of larger constituents such as cysts, viruses, and pesticides. A typical module includes a permeate collection tube, at least one but preferably many membrane envelopes, and an outer housing. While modules are available in a variety of sizes, one of the more common industrial RO modules is available with a standard 8 inch (20.3 cm) diameter and 40 inch (101.6 cm) length. For a typical 8 inch diameter module, 20 to 31 individual membrane envelopes are wound around the permeate collection tube (i.e. for permeate collection tubes having an outer diameter of from about 1 to 3 inches (2.5 to 7.6 cm)). The outer housing of a module may include integral fluid seals to provide a seal within the pressure vessel as described in U.S. Pat. Nos. 6,299,772 and 6,066,254 to Huschke et al. Specific examples of commercially available spiral wound modules include: BW30-440i brackish water modules, SW30-XLE-400i sea water desalination modules, and NF-400 nanofiltration modules available from the FilmTec Corporation. In operation, four to eight modules are typically serially connected within a common pressure vessel. The individual modules within a vessel are typically of the same type, but different types of modules may be used, as described in US 2007/0272628 to Mickols et al.

A spiral wound module suitable for use in the present invention is generally shown at 2 in FIG. 1. The module (2) is formed by winding one or more membrane envelopes (4) and optional feed channel spacer sheet(s) ("feed spacers") (6) about a permeate collection tube (8). Each membrane envelope (4) preferably comprises two substantially rectangular membrane sheets (10) surrounding a permeate channel spacer sheet ("permeate spacer") (12). This sandwich-type structure is secured together, e.g. by sealant (14), along three edges (16, 18, 20) to form an envelope while the fourth edge (22) abuts the permeate collection tube (8) so that the inside portion of the envelope (and optional permeate spacer (12)) is in fluid communication with a plurality of openings (24) extending along the length of the permeate collection tube (8). In a preferred embodiment, the module (2) comprises a plurality of membrane envelops (4) separated by a plurality of feed spacers sheets (6). Membrane envelops (4) are commonly formed by joining the back side surfaces of adjacently positioned membrane leaf packets, wherein each leaf packet comprises a substantially rectangular membrane sheet (10) folded upon itself to define two membrane "leaves" wherein the front sides (34) of each leaf are facing each other and the fold is axially aligned with the fourth edge (22) of the membrane envelope (4), i.e. parallel with the permeate collection tube (8). A feed spacer sheet (6) is shown located between facing front sides (34) of the folded membrane sheet (10). The feed spacer sheet (6) facilitates flow of feed fluid in an axial direction (i.e. parallel with the permeate collection tube (8)) through the module (2). In this embodiment, the membrane envelope (4) is formed by joining the back sides of two adjacently positioned membrane leaves. While not shown, additional intermediate layers may also be included in the assembly.

During module fabrication, permeate spacer sheets (12) may be attached about the circumference of the permeate collection tube (8) with membrane leaf packets interleaved therebetween. The back sides of adjacently positioned membrane leaves are sealed about portions of their periphery (16, 18, 20) to enclose the permeate spacer sheet (12) to form a membrane envelope (4). The membrane envelope(s) (4) and feed spacer(s) (6) are wound or "rolled" about the permeate collection tube (8) to form two opposing scroll faces (30, 32) at opposing ends and the resulting spiral bundle is held in place, such as by circumferentially-wound tape or other means until an outer housing can be secured about the partially constructed module (2). The sealant (14) used for sealing the edges (16, 18, 20) of the membrane envelope (4) preferably permits relative movement of the various sheet materials during the winding process. That is, the cure rate or period of time before which the sealant (14) becomes tacky is preferably longer than that required to assemble and wind the membrane envelopes (4) about the permeate collection tube (8).

Arrows shown in FIG. 1 represent the approximate flow directions (26, 28) of feed and permeate during operation. Feed fluid enters the module (2) from an inlet scroll face (30) and flows across the front side(s) 34 of the membrane sheet(s) (10) and exits the module (2) at the opposing outlet scroll face (32). Permeate fluid flows along the permeate spacer sheet (12) in a direction approximately perpendicular to the feed flow as indicated by arrow (28). Actual fluid flow paths vary with details of construction and operating conditions.

Materials for constructing various components of spiral wound modules are well known in the art. Suitable sealants for sealing membrane envelopes include urethanes, epoxies, silicones, acrylates, hot melt adhesives and UV curable adhesives. While less common, other sealing means may also be used such as application of heat, ultrasonic welding and tape. Permeate collection tubes are typically made from plastic materials such as acrylonitrile-butadiene-styrene, polyvinyl chloride, polysulfone, poly (phenylene oxide), polystyrene, polypropylene, polyethylene or the like. Tricot polyester materials are commonly used as permeate spacers. Representative feed spacers are described in more detail in U.S. Pat. No. 6,881,336 to Johnson. Representative example feed spacers include polyethylene, polyester, and polypropylene mesh materials such as those commercially available under the trade name VEXAR™ from Conwed Plastics. During module fabrication, long glass fibers may be wound about the partially constructed module and resin (e.g. liquid epoxy) is applied and hardened. The ends of modules are often fitted with an anti-telescoping device or end cap (not shown) designed to prevent membrane envelopes from shifting under the pressure differential between the inlet and outlet scroll ends of the module. The end cap is commonly fitted with an elastomeric seal (not shown) to form a tight fluid connection between the module and a pressure vessel (not shown). Examples of end cap designs are described in U.S. Pat No. 6,632,356 to Hallan, et al., including FilmTec Corporation's iLEC™ interlocking end caps. Additional details regarding various components and construction of spiral wound modules are provided in the literature see for example: U.S. Pat. No. 5,538,642 to Solie which describes a technique for attaching the permeate spacer to the permeate collection tube, WO 2007/067751 to Jons et. al which describes trimming operations and the use of a UV adhesive for forming an insertion point seal, and U.S. Pat. No. 5,096,584 to Reddy et al. which describes various embodiments, components and construction techniques particularly suited for gas separations.

For purposes of the present invention, the type of membrane sheet is not particularly limited. The selection of membrane sheet is based on the specific application, feed source, solute, and foulants. While RO and NF flat sheet membranes have been formed from many different materials (e.g. cellulose acetate materials, polysulfone, polyether sulfone), the most commercially successful membranes have been thin film composite membranes. One preferred composite membrane sheet is FilmTec Corporation's FT-30™ membrane. Commercial thin film composite membranes typically comprises a bottom layer (back side) of a nonwoven polyester material web (e.g. PET scrim), a middle layer of a microporous polymer such as polysulfone having a thickness of about 25-125 microns, and top layer (front side) comprising a thin film polyamide layer having a thickness less than about 1 micron and more commonly from about 0.010 to 0.1 micron. The polyamide layer is preferably created by an interfacial polycondensation reaction between a polyfunctional amine monomer and a polyfunctional acyl halide monomer upon the surface of the microporous polysulfone as described in U.S. Pat. Nos. 4,277,344 and 5,658,460 to Cadotte et al; and U.S. Pat. No. 6,878,278 to Mickols. Methods of modifying such polyamide membranes are described in U.S. Pat. No. 5,876,602 to Jons et. al.; U.S. Pat. Nos. 5,755,964, 6,280,853 and US 2009/0159527 to Mickols; U.S. Pat. Nos. 4,888,116; 4,765,897; 4,964,998 to Cadotte et. al. and US 2007/0251883, US 2008/0185332, US 2009/0194479 and US 2009/0220690 to Niu et al. As previously indicated, RO and NF type membrane sheets and corresponding spiral wound modules are preferred with respect to the present invention.

The invention includes a method for testing the integrity of a spiral wound module. As will be described, the method may be qualitative, quantitative or both. The method is preferably conducted in a gaseous environment, i.e. not submerged within a liquid such as a water bath, nor operating "on-line" with liquid flowing through the module. That is, the module is preferably tested while "off-line" without pressurized feed liquid flowing through the module. In a preferred embodiment, the gaseous environment comprises ambient air, e.g. air at atmospheric pressures and temperatures (e.g. from 0 to 50° C.). However, other gas environments may be used, e.g. nitrogen gas provided in a closed or hooded chamber or air at pressure above or below atmosphere. The subject method comprises the steps of: flowing a gas between the scroll face and permeate collection tube wherein the gas has a different temperature than the scroll face; and detecting temperature differences on the scroll face of the spiral wound module. In one embodiment, the step of flowing the gas between the scroll face and permeate collection tube comprises drawing negative pressure from the permeate collection tube such that gas (typically ambient air) is drawn through the scroll faces of the module. This step may be accomplished in a manner similar to conventional vacuum decay type testing, e.g. sealing the ends of the permeate collection tube and drawing a vacuum of from about 10 to 100 kPa. In an alternative embodiment, the step of flowing a gas between the scroll face and permeate collection tube comprises introducing a pressurized gas into the permeate collection tube. The pressurized gas flows through the holes provided along the permeate collection tube, into the membrane envelop(s) and exits the spiral wound module at the scroll faces. Prior to drawing a vacuum or introducing pressurized gas into the permeate collection tube, the opposing ends of the tube are preferably sealed. The step of sealing the opposing ends of the permeate collection tube is not particularly limited and may be accomplished by way of a variety of means including insertion of seals, stoppers or plugs into the opposing ends of the permeate collection tube or by placing a fluid tight cover or barrier over the opposing ends of the permeate collection tube. The step of introducing a pressurized gas into the permeate collection tube is likewise not particularly limited and is preferably performed at pressures less than about 200 kPa, and more preferably less than about 100 kPa above that of the gaseous environment. For example, pressurized gas may be introduced into the permeate collection tube by way of a pipe or hose which is in sealing engagement with an end of the permeate collection tube and in fluid communication with a source of pressurized gas, e.g. a pressurized gas holding tank.

The temperature difference between the gas and scroll face is not particularly limited and is typically selected based upon the sensitivity of the detection step. In most embodiments, the temperature difference between the gas and the scroll face of the spiral wound module is at least 5° C., and in other embodiments at least 10° C., 15° C., 20° C. and even 25° C. Still in other embodiments, the difference in temperature between the gas and scroll face is greater than 30° C. The technique for affecting a difference in temperature is not particularly limited and may be accomplished by heating or cooling the gas relative to the scroll face, heating or cooling the scroll face relative to the gas, or a combination such as cooling the gas and heating the scroll face. By way of example, the scroll face of the spiral wound module may be heated with a radiant heater such as a hair dryer or similar heating device which blows heated air upon the scroll face.

While not particularly limited, the selection of gas may be based upon a variety of criteria, including gases which are: non-reactive with air, non-reactive with components of the module, non-toxic under testing conditions (e.g. carbon dioxide used at low concentration in an open air environment), non-fouling of the membrane envelope, and present in a gaseous state at standard temperature and pressure (STP) conditions. Non-limiting examples of applicable gases include air and nitrogen.

The step of detection is not particularly limited but preferably involves obtaining a thermal image of the scroll face of the spiral wound module. The term "thermal image" refers to an image wherein differences in temperature are observable. The timing of the step of detection is not particularly limited, e.g. detection may be concurrent with or after the step of flowing gas; however, to be most effective the step of detection occurs after a sufficient time and quantity of gas has passed through the scroll face so that differences in temperature may be observed. A thermal image of the scroll face may be recorded or captured by way of a camera. For purposes of the present invention, the term "camera" is intended to broadly include any thermal image capturing device such as video camera, still camera, digital camera, charge-coupled device (CCD) type camera, infrared camera, infrared detector or sensing array. Examples include: infrared cameras such as the ThermaCam™ Prism DS line of thermal imaging cameras available from FLIR Systems Inc, TVS-100 Series Thermal Video Systems available from Cincinnati Electronics Corp., Thermovision 550™ available from Agema Infrared Systems, and a Mikron 7600 observing 8-14 micron wavelengths. The thermal image may include a still, a series of stills or a continuous recording over a period of time. The thermal image may be recorded or stored upon an appropriate medium including but not limited to optical, magnetic or electronic media such as photographic film, floppy disks, compact disk, digital video disk, disk drives, RAM microchips, (flash) memory cards, or other computer readable medium. The storage medium may be locally connected to the camera or may be remotely connected to a communication network such as the internet, a local area network or wide area network to which the camera is also attached or in communication. For example, an image may be electronically captured by a camera and transmitted to a central server using either wireless or wire-based communications channels. The image may also be displayed such as by output to a separate monitor or an integrated screen, e.g. as part of a digital camera. Similarly, the image may be displayed such as by way of output to a printer or X-Y plot. Once captured, the image or series of images may be compared with a reference standard, e.g. a comparable image taken under similar test conditions of a defect-free spiral wound module. For spiral wound modules including a plurality of membrane envelopes (such as shown in FIG. 2B), points or locations on a thermal image may also be compared with adjacent locations, (e.g. rotationally equivalent positions on the scroll face). The thermal image can then be assessed for lack of rotational asymmetry or localized inhomogeneities in temperature. The comparison or assessment may be qualitative or quantitative. To facilitate element autopsy, marks may be made on surface of the scroll face corresponding to regions of high gas flow.

Figure 2A:
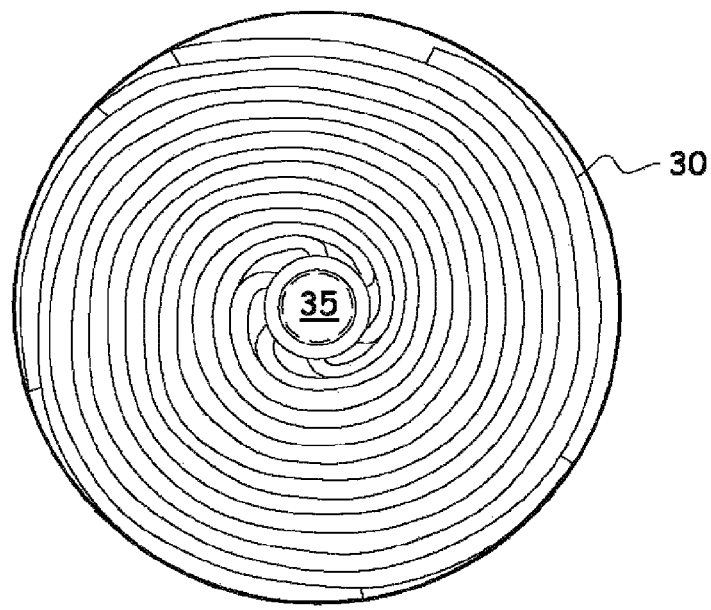
FIG. 2A is an idealized elevational (end) view of a defect-free spiral wound module showing the scroll face of the module during testing.
Figure 2B:
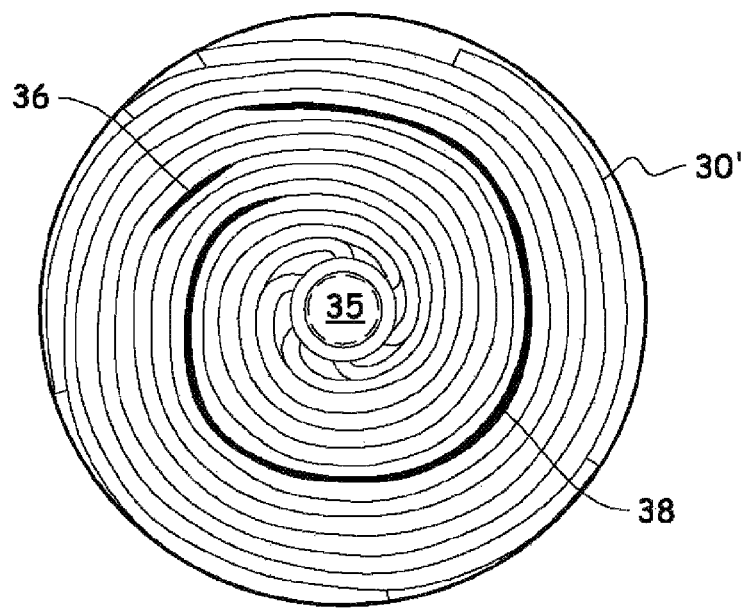
FIG. 2B is an idealized elevational (end) view of a defective spiral wound module showing the scroll face of the module during testing.

As illustrated in FIGS. 2A and 2B, the detection of differences in temperature on the scroll face of the spiral wound module allows for the identification of defects in the module, as manifested by inhomogeneous or asymmetric temperatures on the scroll face. FIG. 2A illustrates an idealized thermal image of symmetric flow of gas from the scroll face (30) of a defect-free spiral wound module equipped with a plug (35) sealing the permeate collection tube (not shown) while being subjected to the present test method. In this idealized case, the gas naturally permeates through the membrane and scroll face, resulting in a relatively homogeneous and rotationally symmetric pattern of temperature change. The actual temperature change is not necessarily uniform across the entire scroll face (30), and in particular has been observed to deviate near the center tube and at the periphery of the scroll face. However, the absence of defects is still indicated by a generally rotationally symmetric temperature distribution on the scroll face and the absence of disproportionate or isolated "hot" or "cold" regions. In contrast, FIG. 2B illustrates an idealized thermal image including a rotationally asymmetric or inhomogeneous distribution of temperatures resulting from a corresponding asymmetric or inhomogeneous flow of gas through the scroll face (30'). In this example, the spiral wound module includes two defects which allow gas to escape (i.e. leak) from an otherwise spiral pathway within a membrane envelop and disproportionately pass through the scroll face in areas (36, 38) adjacent to or in line with defects. For example, either a defect in the glue line or in the membrane near the observed scroll face may significantly increase the amount of gas flowing through a localized region of the feed channel spacer as compared to normal permeation. Alternatively, a defect in the membrane in the middle of leaf may result in a spiral pattern on the scroll face. Both patterns may be readily distinguished from patterns for a defect-free module, despite the unknown rate of natural permeation of gas through defect-free membrane. In addition to identifying the location of defects, the volume of gas flowing through the scroll face at a given location (as represented by a more rapid or larger temperature differential) may also provide information regarding the nature and magnitude of the defect. For example, the intensity of temperature differentials at a given location of the scroll face, as shown in a thermal image captured by an IR camera, can be related to the volume of gas passing through the scroll face and can be correlated to the magnitude of a leak. Such evaluations may be facilitated by signal process techniques, including comparisons with reference images maintained in a database. Such comparisons may be based upon a still image (a point in time), or a series of images integrated over a period of time. Electronic signal analyzers and general purposes digital computers may be used to facilitate the analysis of such images. The use of such equipment and applicable techniques are described in: U.S. Pat. Nos. 5,640,236; 5,763,765; 6,766,259; 6,680,778; US 2002/0176617, the entire contents of which are incorporated herein by reference. Thus, asymmetric or inhomogeneous temperatures on the scroll face, as captured by a camera, represent leaks in the module which can be correlated to the location, magnitude and nature of a defect.

FIG. 3A schematically illustrates an idealized set-up for practicing one embodiment of the invention. As shown, an IR camera (40) is positioned facing toward a scroll face (30) of a spiral wound module (2). The camera (40) may be optionally connected to an image storage device and signal processor such as a general purpose computer (42) which may be optionally connected to a monitor (44) or printer (not shown) for displaying images captured by the camera (40). A plug (35) seals one end of the permeate collection tube (8) with the opposite end in sealing engagement with pipe (48). Pressurized gas is introduced into the permeate collection tube (8) by way of a pipe (48) connected to a source of pressurized gas such as a holding tank (50) including a valve (52). Once pressurized gas is introduced into the permeate collection tube (8), gas flows through membrane envelop(s) in fluid communication with the permeate tube (not shown). A portion of the gas may pass through the membrane (particularly defects in the membrane such as pin holes, etc.) and ultimately exits the module (2) at the scroll face (30). A thermal image of the scroll face (30) is recorded by the camera (40) and may be optional stored, analyzed and displayed via computer (42) and monitor (44). In a preferred embodiment, the thermal image is compared with that of a reference standard (e.g. image taken from a defect-free module tested under similar test conditions, i.e. same gas, pressures, time delay between imaging, etc.), such as by way of known image processing techniques previously noted in the prior art.

FIG. 3B illustrations an alternative idealized set-up for practicing another embodiment of the invention. A plug (35) seals one end of the permeate collection tube (8) with the opposite end in sealing engagement with pipe (48). A vacuum is introduced into the permeate collection tube (8) by way of a pipe (48) connected to a source of reduced pressure such as a vacuum pump (46) including a valve (52). Once a vacuum is introduced into the permeate collection tube (8), gas, (e.g. air), flows through membrane envelop(s) in fluid communication with the permeate tube (not shown). A thermal image of the scroll face may be recorded and analyzed as describe with reference to FIG. 3A.

The sensitivity of pressure and vacuum decay tests (such as those described in ASTM D 6908-03) is typically limited by variability in the rate at which air passes through "good" membrane within a defect-free module. That is, background air passage varies significantly from module to module. Preferred embodiments of the present invention are an improvement over such prior techniques as they have the ability to spatially resolve separate regions of the scroll face, thereby allowing leaks to be compared at a high sensitivity with typical background gas passage within the same module. Such an improvement can be achieve while testing modules in either a dry state (e.g. after module assembly but prior to the introduction of a liquid feed stream into the module or soaking the module within liquid, or if exposed to such liquid, after forced air drying of the module) or wet state (i.e. modules that have previously been soaked or operated "on-line" and have liquid-filled pores). When testing modules provided in a wet state, the modules are preferably drained prior to testing as standing water can potentially mask a defect. As the number of membrane envelopes within the module increases, preferred embodiments of the present invention become increasingly advantaged as compared with the previously described vacuum test method. In a preferred embodiment, the module comprises more than 50 membrane envelopes.

While the specific design of the spiral wound module may vary from that previously described, the spiral wound module preferably includes at least a permeate collection tube extending between two opposing ends and including a plurality of openings along its length, and at least one membrane envelope wound about the permeate collection tube and forming two opposing scroll faces, wherein the membrane envelope is in fluid communication (and preferably in sealing engagement) with the openings along the permeate collection tube. The membrane envelope is not particularly limited and may comprise a wide range of designs, compositions and structures. However, in several preferred embodiments, the membrane envelope comprises a structure which functions as an RO or NF membrane.

The entire content of each of the aforementioned patents and patent applications are incorporated herein by reference.

The invention claimed is:

1. A method for testing a spiral wound module comprising a permeate collection tube extending between two opposing ends and including a plurality of openings along its length, and at least one membrane envelope wound about the permeate collection tube and forming two opposing scroll faces, wherein the membrane envelope is in fluid communication with the openings along the permeate collection tube; wherein the method comprises the steps of:
    flowing a gas between the scroll face and permeate collection tube wherein the gas has a different temperature than the scroll face; and
    detecting temperature differences on the scroll face of the spiral wound module.

2. The method of claim 1 wherein the step of flowing a gas between the scroll face and permeate collection tube comprises drawing negative pressure from the permeate collection tube.

3. The method of claim 1 wherein the step of flowing a gas between the scroll face and permeate collection tube comprises introducing a pressurized gas into the permeate collection tube.

4. The method of claim 1 wherein the difference in temperature between the gas and the scroll face of the spiral wound module is at least 5° C.

5. The method of claim 1 wherein the step of detecting comprises obtaining a thermal image of the scroll face of the spiral wound module.

6. The method of claim 5 wherein the thermal image of the scroll face of the spiral wound module is recorded by a camera.

7. The method of claim 6 wherein the thermal image is compared with a reference standard.

8. The method of claim 6 wherein the spiral wound module comprises a plurality of membrane envelopes and wherein the thermal image is analyzed for localized inhomogeneities in temperature.

9. The method of claim 1 wherein the membrane envelope comprises a reverse osmosis or nanofiltration membrane.

10. The method of claim 1 wherein the spiral wound module comprising a plurality of membrane envelopes.

* * * * *